United States Patent [19]

Kun et al.

[11] Patent Number: 4,535,341

[45] Date of Patent: Aug. 13, 1985

[54] THIN FILM ELECTROLUMINESCENT LINE ARRAY EMITTER AND PRINTER

[75] Inventors: Zoltan K. Kun; Paul R. Malmberg, both of Pittsburgh, Pa.

[73] Assignee: Westinghouse Electric Corp., Pittsburgh, Pa.

[21] Appl. No.: 524,807

[22] Filed: Aug. 19, 1983

[51] Int. Cl.[3] .......................... B60Q 1/00; H05B 37/00

[52] U.S. Cl. ................................ 346/107 R; 313/509; 315/169.3; 340/781; 340/825.81; 346/108; 354/4; 354/5

[58] Field of Search ........................... 340/825.81, 781; 315/169.3; 313/509; 346/107 R, 108; 354/4, 5

[56] References Cited

U.S. PATENT DOCUMENTS 3,530,259 9/1970 Miller et al. ................ 346/107 R X
3,988,536 10/1976 Moricca ........................ 315/169.3 X
4,006,383 2/1977 Luo et al. ........................ 313/509 X
4,110,664 8/1978 Asars et al. ....................... 315/169.3
4,159,443 6/1979 Stocker et al. .................... 315/169.3
4,367,946 1/1983 Varner ........................ 346/107 R X

*Primary Examiner*—Robert Lindsay
*Attorney, Agent, or Firm*—Thomas R. Trempus

[57] ABSTRACT

The invention provides a thin film electroluminescent line array emitter structure which provides edge emissions which are typically 30 to 40 times brighter than the conventional face emissions. In an alternative embodiment, the emitter structure includes an integral capacitor in series with each emitter structure pixel. This integral thin film structure dielectric and phosphor composite layer serves both as the light-emitting layer for the edge-emitting device and as the dielectric for the capacitor.

21 Claims, 6 Drawing Figures

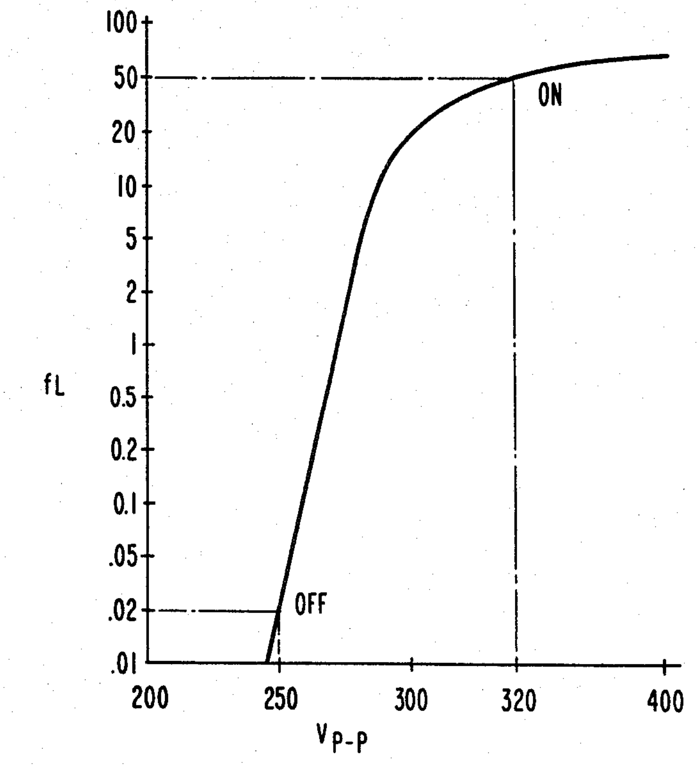
FIG. 3
FIG. 4
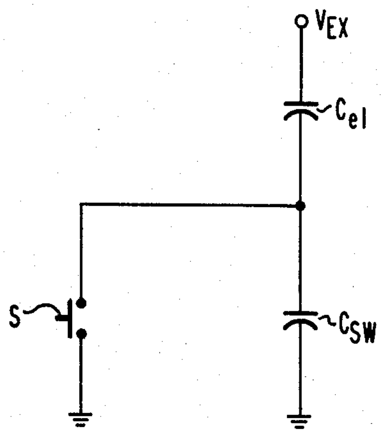

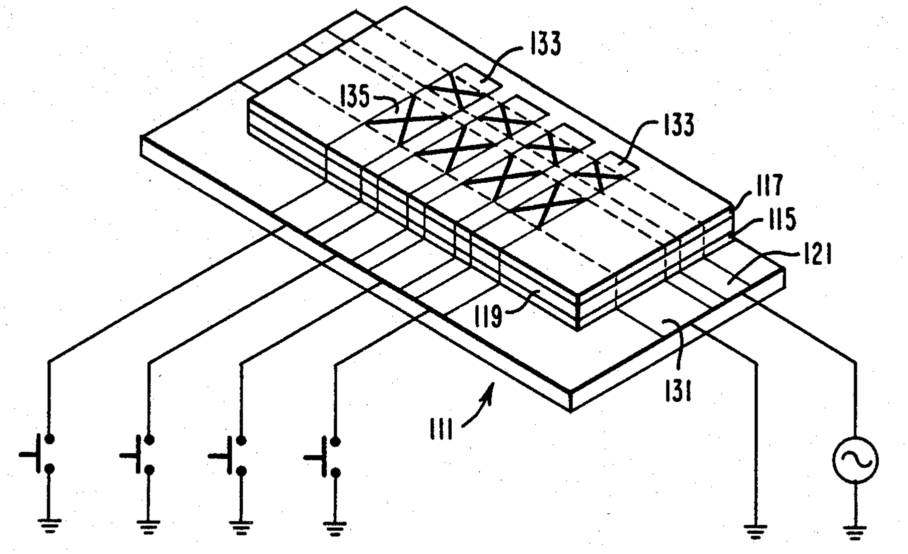
FIG. 5
FIG. 6
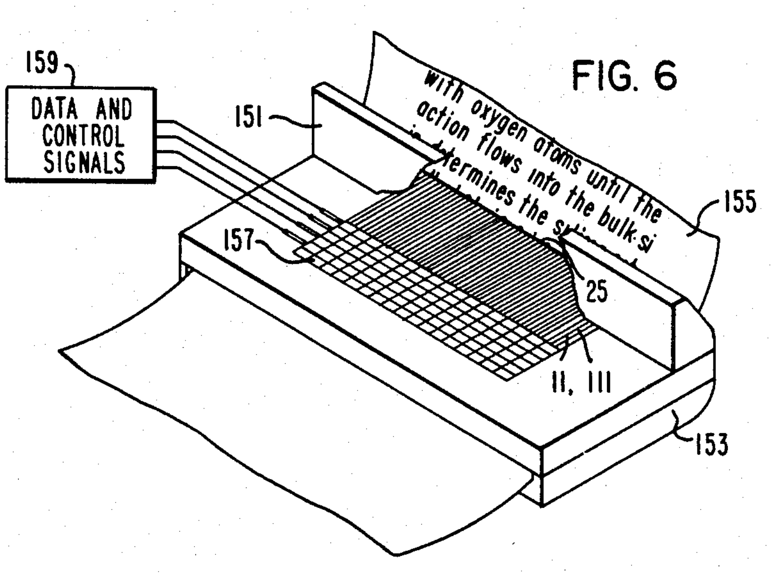

THIN FILM ELECTROLUMINESCENT LINE ARRAY EMITTER AND PRINTER

BACKGROUND OF THE INVENTION

The invention relates to electronically controlled high resolution light sources of the type typically utilized in high performance light-activated printers, photocomposition systems, chart recorders, and other hard copy devices. More particularly, the invention provides a solid state light source for use in the above noted as well as other similar applications.

It is now the practice that light-activated printers which are capable of 1000 to 2000 point horizontal resolution, frequently use lasers or fiber-optic faceplate cathode ray tubes. Such printers are more versatile than impact printers and can, for instance, print different type styles and sizes at any time, under electronic control.

It is also known to utilize electroluminescent devices in various flat panel display devices. An example of this type of application is disclosed in U.S. Pat. No. 4,110,664 to Asars et al which is assigned to the assignee of the present invention and which is incorporated herein by reference. The flat panel display device of the above-identified patent is an electroluminescent bargraph display system which includes, on a unitary substrate, a plurality of discrete individually controllable adjacent electroluminescent display elements interconnected to a thin film transistor dynamic shift register. Individual stages of the shift register are connected to individual display elements. The electroluminescent display element utilized in such a system is of the type in which one of the electrodes for use with the electroluminescent phosphor is a common light transmissive member. This common electrode is contiguous with the device face and the emissions must pass through this electrode. The structure of such a display panel may also be seen in U.S. Pat. No. 4,006,383 to Luo et al. which is assigned to the assignee of the present invention and which is incorporated herein by reference. The Luo et al. patent teaches an electroluminescent display panel structure in which individual electroluminescent electrodes cover a large area of the panel in order to increase the active display area. Here again, the face of the electroluminescent element is the display surface electrode.

It is an object of this invention to provide an AC excited, thin film electroluminescent line array consisting of individually addressable pixels emitting light from the edge of the line array.

It is a further object of this invention to provide a thin film electroluminescent line array structure having a capacitor for each pixel as an integral component of the structure wherein the phosphor-insulator composite layer serves both as the light-emitting layer for the edge-emitting element and as the capacitor dielectric.

It is another object of this invention to provide a thin film electroluminescent line array which provides adequate light emission and speed of response for the exposure of a photosensitive medium. The line array of this invention in combination with a light-activated printer or similar apparatus renders a device having superiority in resolution, speed, reliability, small size and cost.

SUMMARY OF THE INVENTION

A thin film electroluminescent line array structure has a first and second dielectric layer with a phosphor layer disposed therebetween. Each of the dielectric layers defines a structure face. One edge of the structure, generally perpendicular to the faces, is the light emission surface. The structure includes a plurality of control electrodes disposed on the first dielectric layer and an excitation bus disposed on the second dielectric layer defining therebetween a plurality of pixels. In an alternative embodiment, a ground bus is disposed on said second dielectric layer in a spaced relationship with the excitation bus. The ground bus defines in combination with each of the control electrodes and the dielectric and phosphor layers therebetween an integral capacitor in series with each pixel.

BRIEF DESCRIPTION OF THE DRAWINGS

The above as well as other features and advantages of the present invention will become apparent through consideration of the detailed description in connection with the accompanying drawings in which:

FIG. 3 is a graph illustrating the brightness vs voltage characteristics of a thin film electroluminescent device;

FIG. 4 is a schematical representation of a thin film electroluminescent line emitter structure with a series capacitor to limit switch voltage;

FIG. 5 is a somewhat schematical illustration of a thin film electroluminescent line emitter with integral capacitor structure; and FIG. 6 is a somewhat schematical illustration of a line printer device incorporating the thin film electroluminescent device according to this invention.

DESCRIPTION OF THE PREFERRED EMBODIMENT

The present invention is a thin film electroluminescent (TFEL) line array emitter which is utilized as a solid state, electronically-controlled high resolution light source. The inventors have discovered that the brightness of light that is emitted from a TFEL structure on its edge is significantly brighter than the face emission under approximately the same excitation conditions. By way of example, an increase in brightness of between about thirty to forty times that of the face emission is obtainable in a TFEL device according to the invention. As previously discussed herein, the light emission typically utilized in a TFEL device is the face emission which is attenuated by the transparent electrode.

Figure 1:
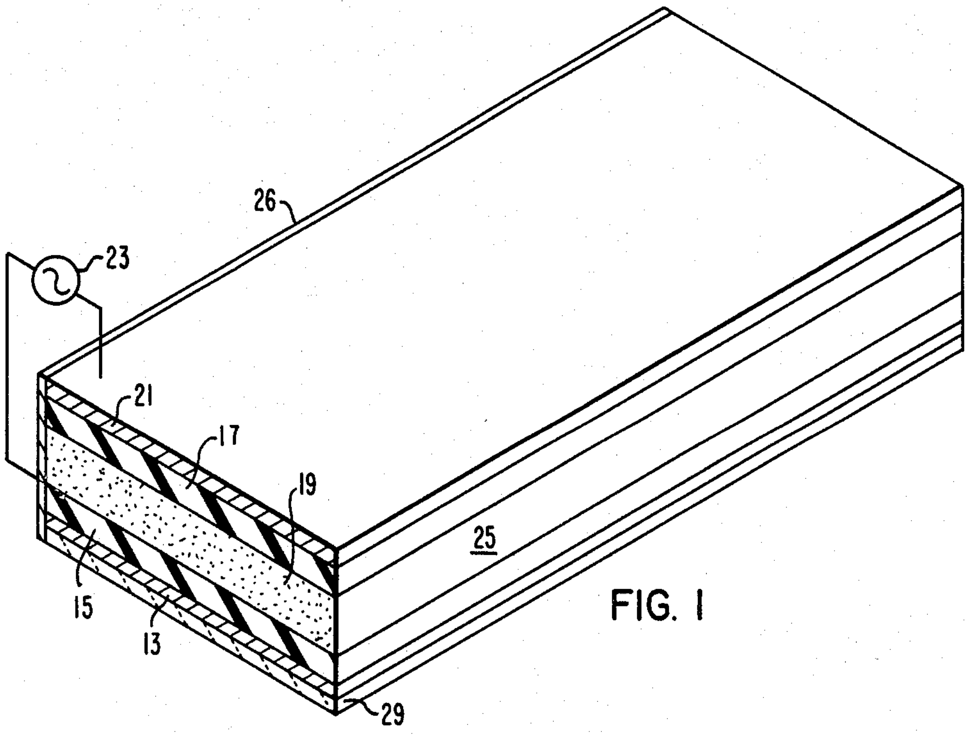
FIG. 1 is a cross-sectional view through a portion of the thin film electroluminescent device according to the invention.
Figure 2:
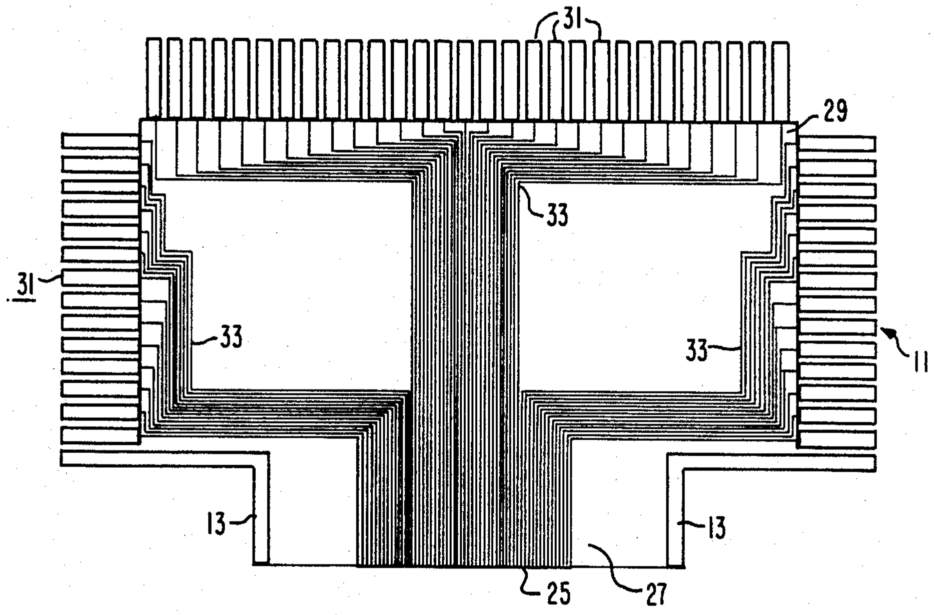
FIG. 2 is a plan view of an electroluminescent device illustrating the electrode pattern which defines a plurality of pixels in the line array.

The basic structure of a thin film electroluminescent line array emitter element is shown in FIGS. 1 and 2 and generally indicated by the reference character 11. The TFEL element 11 includes a common electrode 13, a first dielectric layer 15, a second dielectric layer 17, a phosphor layer 19 disposed between the first and second dielectric layers and an excitation and top electrode 21. An excitation source 23 is in electrical communication with the common electrode 13 and top electrode 21 to provide the voltage necessary to excite the electroluminescent phosphor layer 19. The edge of the emitter, as at 25, is the emission source, contrary to the conventional electroluminescent devices which utilize face emission as described elsewhere herein. The back of the device, that is the edge opposite the emission source, as at 26 is preferably mirrored with a suitable non-conductive reflector.

At least one of the electrodes, for illustrative purposes herein the top electrode 21, is fabricated to define, in combination with the remaining components of the device, a plurality of pixels of the line array. As shown in FIG. 2, the top electrode 21 consists of a plurality of individual electrodes 27 which can be formed, for example, by the ion milling of the electrode material after its placement in the dielectric 17 and substrate 29. Ion milling is the preferred technique because the electrodes can be cut or formed to the required dimensions without causing any impairment to the behavioral characteristics of the electroluminescent device generally, or the phosphor material in particular. An electrode 21*a* has been defined by photolithography to consist of 166 electrodes (as at 27) per inch. Each individual electrode 27 forms a light-emitting pixel. To facilitate electrical connection with the array structure, the aluminum electrodes 21 are connected to 20 lines/inch edge pads 31 via fan-outs 33. This electrode pattern is, of course, for illustrative purposes only and any suitable pattern known to those skilled in the art can be utilized to effect electrical contact.

In the formation of a TFEL device according to this invention the substrate 29 was cut from 1.5 mm thick sodalime glass to form a base size of 86 by 45 mm. It is preferred that the substrate be cut slightly larger and then polished to size in order to avoid rough edges from which the debris can damage the layers of film deposited thereon. The substrate was coated with electrically conductive indium tin oxide film which was then etched using photolithography.

The dielectric material and phosphor were deposited onto the electrode layered substrate by E-beam evaporation in a vacuum chamber. A 2000 Å thick yttrium oxide $Y_2O_3$ layer forms the first dielectric. Next a 5000 Å ZnS:Mn layer is deposited on the 2000 Å $Y_2O_3$ film. The composition of the electroluminescent phosphor source material is preferably selected to produce a device having luminescence characteristics favorable for line array emitter application; specifically, fast luminescence decay permitting the required one millisecond refresh rate.

The ZnS layer is annealed and then cooled for the deposition of another 2000 Å layer of $Y_2O_3$. Finally, the whole substrate is covered with a 1000 Å thick aluminum film. The top aluminum electrodes are ion milled as described above in order to define the individual elements.

The operation of TFEL line emitter devices commonly requires AC operating voltages in excess of the ratings of commonly available integrated circuits. The typical practice is the use of a capacitor in shunt with a transistor switch connected in series with each TFEL element. This configuration permits ON-OFF control of the light-emitting element at the lower voltage level appearing across the capacitor.

A highly non-linear brightness to voltage characteristic is known to exist in a TFEL element as illustrated in the graph of FIG. 3 for a typical operating frequency of 1 KHz. Up to an applied voltage no greater than the threshold voltage, $V_{th}$, essentially no light is emitted. As the applied voltage becomes greater than the threshold voltage, $V_{th}$, the level of emission increases rapidly, soon reaching a plateau at which the TFEL element is considered ON. Thus switching a light-emitting element from OFF to ON therefore requires only a change in applied voltage from a standby or OFF voltage slightly less than $V_{th}$ to an operating or ON voltage greater than $V_{th}$. Preferably, the operating or ON voltage is at or close to the plateau region.

Actual measurements of light output from a TFEL emitter under conditions of switching from zero to 320 V peak-to-peak and from 240 to 320 V peak-to-peak have demonstrated that the light output is approximately the same under the two operating conditions. A square waveform at an operating frequency of 8 KHz with an ON time of one ms. and a repetition rate set at 500 per second was used. As can be appreciated, the ON-OFF differential in applied voltage is 320 V peak-to-peak in the first example and in the second example only 80 V peak-to-peak which is within the ratings of commercially available integrated circuits.

Considering FIG. 4, it can be seen that a practical way of presenting the limited differential switch voltage to the switch transistor S is to place a capacitor $C_{sw}$ in shunt with the series transistor so that the supply or excitation voltage $V_{ex}$ is divided between the capacitance of the TFEL device, $C_{el}$, and that of the capacitor, $C_{sw}$. With this arrangement, the switch transistor in the OFF condition sees only the voltage $V_{sw}$ where:

$$V_{sw}=V_{ex}[C_{el}/(C_{el}+C_{sw})]$$

The voltage $V_{sw}$ can be adjusted to the desired level by the value assigned to $C_{sw}$. Thus, for example, if $C_{sw}=3\,C_{el}$, then $V_{sw}=\frac{1}{4}V_{ex}$.

It is another feature of this invention to provide the capacitor $C_{sw}$ (as shown in FIG. 4) as an integral part of the TFEL device structure. This embodiment of a TFEL line emitter structure is illustrated in FIG. 5 and generally indicated by the reference character 111. The arrangement of the TFEL element 111 is to a certain extent identical to the TFEL element 11 of FIG. 1: including a first dielectric layer 115, a second dielectric layer 117 and a phosphor layer 119 disposed therebetween. However, the excitation electrode is divided into two parts 121 and 131, one underlying the light-emitting element portion of each pixel, the other forming the common electrode for the capacitor $C_{sw}$. Since the width of the bus forming the light-emitting element, as at 133, defines the width of the capacitive element also, as at 135, the relative capacitance $C_{el}$ and $C_{sw}$ are a function of the relative widths ($W_{el}$ and $W_{sw}$) of these two electrodes. Thus:

$$C_{el}/C_{sw}=W_{el}/W_{sw}$$

and therefore:

$$V_{sw}=V_{ex}[W_{el}/(W_{el}+W_{sw})]$$

where $W_{el}$ is the width of the excitation electrode and $W_{sw}$ is that of the common capacitor electrode. It has been found that the required width dimensions are relatively large and easily held to precise values by the lithograph processes as described above. This results in an accurately determinable switching voltage $V_{sw}$.

In FIG. 6, a somewhat schematical illustration represents one configuration in which the present invention is mounted in a printer means generally indicated at 151. The printer includes a drive means 153 for a photosensitive medium, such as paper 155. The TFEL element 11, 111 is mounted within the printer 151 so that the paper 153 is in direct contact with, or in close proximity to, the edge of the emitter 25 which is the emission source. The TFEL element 11, 111 is in electrical communication with the required TFEL drive circuitry, schematically illustrated at 157. Data and control signal source 159 is in communication with the drive circuitry 157. A line of information content from the data and control signal source 159 is provided by the voltages addressed to the individual electrodes and pixel areas of the line array by the drive circuitry 157. The drive circuitry 157 preferably includes means to provide excitation voltage to the control electrode and switch means to switch the excitation voltage from an OFF or standby position to an ON level. The control electrodes are serially addressed in a line-at-a-time fashion. The excitation voltage excites the electroluminescent phosphor at the pixel area to a brightness level corresponding to the information content for that line. The paper drive means 153 moves the photosensitive paper relative to the line array so that each line of information content is sequentially disposed onto the paper by emission exposure. This technique permits the formation of a composite exposed copy of, for example, a typewritten format. The drive circuitry is commercially available and examples of suitable drive means are found in U.S. Pat. No. 4,110,662 which is assigned to the assignee of the present invention and incorporated herein by reference.

What has been described is a thin film electroluminescent line emitter structure which utilizes light emitted by the edge of the structure, thus rendering a high brightness, narrow light source which is significantly brighter than the face emission. In an alternative embodiment, the TFEL structure includes an integral capacitor structure which provides precise capacitance ratios while requiring minimal complexity in the TFEL. In this alternative embodiment, the TFEL phosphor-insulator composite layer serves both as the light-emitting layer for the edge-emitting device and as the dielectric for the capacitor in shunt with an external transistor switch. The several embodiments of this invention can be used in light-activated printers, photocomposition systems, chart recorders and various other hard copy devices.

What is claimed is:

1. A thin film electroluminescent line array emitter structure comprising a common electrode, a first dielectric layer disposed on said common electrode, a second dielectric layer, a phosphor layer disposed between said first and second dielectric layer and a plurality of control electrodes disposed on said second dielectric layer and defining thereby a plurality of pixels; said emitter structure having a first and a second face generally defined by said common and control electrodes respectively and an emitting edge generally perpendicular to said first and second faces, said emitting edge being defined by said plurality of pixels.

2. The thin film electroluminescent line array emitter structure according to claim 1 wherein the emitter structure includes a substrate and one of said electrodes is disposed thereon.

3. The thin film electroluminescent line array emitter structure according to claim 1 wherein the first and second dielectric layers consist of yttrium oxide ($Y_2O_3$).

4. The thin film electroluminescent line array emitter structure according to claim 1 wherein the phosphor layer consists of zinc sulfide with a manganese dopant (ZnS:Mn).

5. The thin film electroluminescent line array emitter structure according to claim 1 wherein the emitter structure includes a third electrode which in combination with the first and second dielectric layers and the phosphor layer provides an integral capacitor structure within the emitter structure in shunt with each pixel.

6. The thin film electroluminescent line array emitter structure according to claim 5 in combination with means to provide excitation voltage to the control electrode and switch means to switch said excitation voltage from an off or standby level to an on level.

7. The thin film electroluminescent line array emitter structure according to claim 5 wherein the edge of said structure opposite the light-emitting edge thereof includes an electrically non-conductive reflective coating.

8. The thin film electroluminescent line array emitter structure according to claim 1 wherein the edge of said structure opposite the light-emitting edge thereof includes an electrically non-conductive reflective coating.

9. A thin film electroluminescent line array structure comprising a first dielectric layer, a second dielectric layer, a phosphor layer disposed therebetween such that each of said dielectric layers defines a structure face and an edge of said structure, generally perpendicular to said faces is the light emission surface, said structure including a plurality of control electrodes disposed on said first dielectric layer and an excitation bus disposed on said second dielectric layer, defining therebetween a plurality of pixels, and a ground bus disposed on said second dielectric layer in a spaced relationship with said excitation bus, said ground bus defining in combination with each of said control electrodes and said dielectric and phosphor layers therebetween an integral capacitor in series with each said pixel.

10. The thin film electroluminescent line array emitter structure according to claim 9 wherein the emitter structure includes a substrate and one of said electrodes is disposed thereon.

11. The thin film electroluminescent line array emitter structure according to claim 9 wherein the first and second dielectric layers consist of yttrium oxide ($Y_2O_3$).

12. The thin film electroluminescent line array emitter structure according to claim 9 wherein the phosphor layer consists of zinc sulfide with a manganese dopant (ZnS:Mn).

13. The thin film electroluminescent line array emitter structure according to claim 9 in combination with means to provide excitation voltage to the control electrode and switch means to switch said excitation voltage from an off or standby level to an on level.

14. The thin film electroluminescent line array emitter structure according to claim 9 wherein the edge of said structure opposite the light-emitting edge thereof includes an electrically non-conductive reflective coating.

15. In combination with a printer means including a thin film electroluminescent drive circuitry for providing excitation voltage, and a paper drive means; a thin film electroluminescent line array emitter structure comprising a common electrode, a first dielectric layer disposed on said common electrode, a second dielectric layer, a phosphor layer disposed between said first and second dielectric layer, and a plurality of control electrodes disposed on said second dielectric electrode and defining thereby a plurality of pixels; said emitter structure having a first and a second face generally defined by said common and control electrodes respectively and an emitting edge generally perpendicular to said first and second faces, said emitting edge being defined by said plurality of pixels wherein said drive circuitry voltage is addressed to the individual control electrodes and pixel areas of the line array and wherein the drive means moves the paper relative to the line array.

16. The thin film electroluminescent line array emitter structure according to claim 15 wherein the emitter structure includes a substrate and one of said electrodes is disposed thereon.

17. The thin film electroluminescent line array emitter structure according to claim 15 wherein the first and second dielectric layers consist of yttrium oxide ($Y_2O_3$).

18. The thin film electroluminescent line array emitter structure according to claim 15 wherein the phosphor layer consists of zinc sulfide with a manganese dopant (ZnS:Mn).

19. The thin film electroluminescent line array emitter structure according to claim 15 wherein the emitter structure includes a third electrode which in combination with the first and second dielectric layers and the phosphor layer provides an integral capacitor structure within the emitter structure in shunt with each pixel.

20. The thin film electroluminescent line array emitter structure according to claim 19 wherein the edge of said structure opposite the light-emitting edge thereof includes an electrically non-conductive reflective coating.

21. The thin film electroluminescent line array emitter structure according to claim 15 wherein the edge of said structure opposite the light-emitting edge thereof includes an electrically non-conductive reflective coating.

* * * * *